No. 873,074. PATENTED DEC. 10, 1907.
O. H. NOWAK.
SUBSTANCE FOR TREATING HIDES AND PROCESS OF MAKING SAME.
APPLICATION FILED SEPT. 16, 1905.
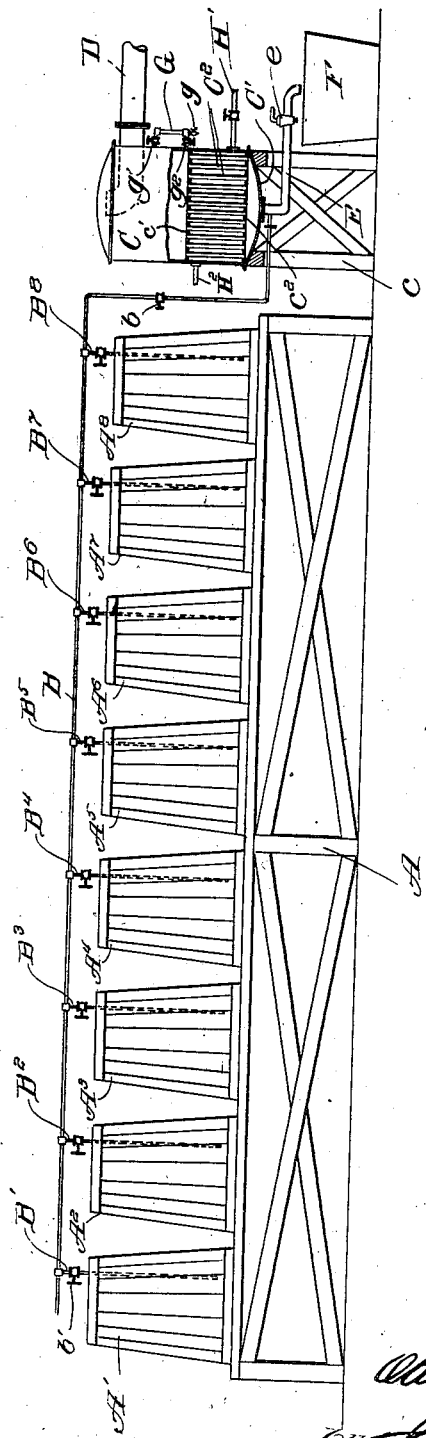

UNITED STATES PATENT OFFICE.

OTTOKAR HENRY NOWAK, OF CHICAGO, ILLINOIS, ASSIGNOR TO NOWAK MANUFACTURING COMPANY, A CORPORATION OF ILLINOIS.

SUBSTANCE FOR TREATING HIDES AND PROCESS OF MAKING SAME.

No. 873,074.  Specification of Letters Patent.  Patented Dec. 10, 1907.

Application filed September 16, 1905. Serial No. 278,822.

*To all whom it may concern:*

Be it known that I, OTTOKAR HENRY NOWAK, a subject of the Emperor of Austria-Hungary, residing at Chicago, county of Cook, State of Illinois, have invented a certain new and useful Improvement in Substances for Treating Hides and Processes of Making the Same, and declare the following to be a full, clear, and exact description of the same, such as will enable others skilled in the art to which it pertains to make and use the same, reference being had to the accompanying drawings, which form a part of this specification.
My invention relates to a substance for use in preparing and tanning hides and skins, and to a process of producing such substance from milk.

In the practice of the so-called "quick" tanning processes to convert the hides or skins into leather, sulfuric or other mineral acid is often used in bating or unliming, in plumping or swelling, and in composition with tannic acid in tanning. The mineral acids employed in such quick processes render the leather hard and brittle and consequently deteriorate its quality. The acids also deleteriously affect the gelatin in the hides and skins to such an extent that it is a common practice to treat them with glucose to increase their weight.

In order that the highest possible grade of leather may be made, substances should be used in the several steps of the tanning process which are: 1. Free from all mineral acids, but of high natural organic acidity. 2. Readily miscible with water in any proportion and of very light color. 3. Capable of readily neutralizing lime or other alkalies and of high bacterial action. 4. Incapable of attacking or destroying the gelatin of the hides or skins. 5. Incapable of injuring the grain or fiber of the hides or skins. 6. Capable of rendering and maintaining the hides or skins plump through the entire process of tanning the heavier classes of leather so that they will be readily impregnated with the tannage, and capable of depleting the hides or skins in making the lighter classes of leather to leave them thin and flexible.

The primary object of my invention is to provide a substance for use in tanning which will possess the above enumerated desirable characteristics.
My invention as herein disclosed may be generally described as a process consisting in precipitating the curd in milk, removing the precipitated curd, changing the condition of the sour liquor remaining after the removal of the curd by permitting fermentation thereof for a period of at least seven days, so that it contains at least 1% acidity calculated as lactic acid, concentrating the fermented sour liquor, and finally adding some unconcentrated fermented sour liquor to the concentrated fermented sour liquor.

My invention also consists in a bacterial substance derived from milk composed of concentrated and unconcentrated fermented sour liquor.

My invention will be more fully described hereinafter with reference to the accompanying drawing in which is illustrated one form of apparatus for practicing my improved process and for producing my improved product.

My invention consists essentially in preparing from cow's milk, either in the form of skimmed milk or buttermilk, a substance to be used in several of the steps of the tanning process. The average cow's milk contains at least 2.5 grams of citric acid in every 1000 grams, which renders milk of great value as a substance for use in tanning leather owing to citric acid possessing the above enumerated desired characteristics.

I first permit the precipitation of the curd contained in skimmed milk, or in buttermilk, or in a mixture of skimmed milk and buttermilk, which generally occurs as the result of decomposition within twelve hours from the time of the removal of the cream at a temperature of 120 to 125 degrees F. The precipitation is effected by the sourness produced by the decomposition of the milk rather than by the usual practice of using sulfuric, hydro-chloric, or acetic acid, or rennet, in order that the product derived from the milk may have only natural organic acidity and be entirely free from foreign acids or substances. The precipitated curd is next removed from the liquid part of the milk in any desired manner, as by use of a mechanical separator. In order to promote the precipitation of the curd a predetermined quantity of the natural sour liquor previously obtained from milk after removing the curd therefrom, is added while the milk is constantly agitated. When the milk has been placed in a tank of 2500 gallons capacity containing 1900 to 2000 gallons of milk an addition of 500 to 600 gallons of the natural sour liquor previously obtained from milk after removing the curd therefrom, is sufficient.

The sour liquor remaining after the removal of the curd is placed in a wooden vat or tank, a series of such vats being provided so that the liquor produced each day may be placed in a separate vat, and allowed to remain there a predetermined period of time, preferably twelve days while fermentation is taking place. In addition to the natural acidity of about 1.5% calculated as lactic acid, the sour liquor contains sugar of milk as its principal component which is converted into acids by fermentation. In order to start the fermentation more quickly and thoroughly, and to increase the same, sour rye flour dough is added to each vat or tank, which acts similarly to yeast. Four ounces of the sour dough added to each 2500 gallons is sufficient. The use of sour dough is, however, not essential as the continuous use of vats or tanks results in bacteria being present in the wood in sufficient quantity to produce the fermentation without adding any ingredient such as sour dough. The sour liquor increases its temperature to about 90 to 100 degrees F. on the third day, when life or action commences resulting in the generation of carbonic acid gas by the fermentation and oxidation of the sugar of milk as it is converted into acid. This action continues, the fermentation and oxidation increasing from day to day with a slight increase of temperature, until about the seventh day when the fermentation slows down rapidly and finally ceases. This period of fermentation results in an increase of acidity to from 3.5% to 4%. The fermented sour liquor thus obtained may be used in the various steps of the tanning process in lieu of the sulfuric or other acid at present usually employed, but in order that the storage and transportation of the sour liquor to the tanneries may be facilitated, it is preferably concentrated to a consistency similar to that of condensed milk, or that of paste, or even, if desired, it may be converted into a dry, solid, extract of crystal-like form.

In the drawing is illustrated a convenient form of apparatus for concentrating the sour liquor.

Reference characters $A'$, $A^2$, $A^3$, $A^4$, $A^5$, $A^6$, $A^7$, $A^8$ indicate wooden vats or tanks each of which contains the sour liquor. The vats may be supported in any suitable manner, as for instance by a structure A. Depending within the vats are pipes $B'$, $B^2$, $B^3$, $B^4$, $B^5$, $B^6$, $B^7$, $B^8$, the lower ends of which are open and are located adjacent to the bottoms of the vats. The upper ends of the pipes are connected to a common conduit B which communicates with vacuum pan C. A valve $b'$ controls the communication from each of the pipes within the several vats and the pipe B, while a valve $b$ controls the communication of the common pipe B with the vaccum pan. The vacuum pan has a series of tubes $C^2$ connected at their opposite ends with headers $c'$ and $c^2$. Steam is admitted to the space around the vertical tubes $C^2$ from a steam supply conduit $H'$.

$H^2$ indicates the conduit through which the steam passes from the space around the vertical tubes. A discharge pipe E leads from the bottom $C'$ of the vacuum pan through which the condensed liquor is permitted to flow by opening a valve $e$ into a suitable receptacle F.

D indicates a conduit extending from the interior of the vacuum pan near the top thereof from which vapor is exhausted by any suitable means. In order that the condition of the liquor within the vacuum pan may be ascertained a gage G is provided the ends of which communicate with the interior of the vacuum pan. Valves $g'$ and $g^2$ control the communication between the ends of the gage and the vacuum pan while a valve $g$ controls the discharge of the liquor from the gage.

The tank in which the sour liquor has completed fermentation is connected with the vacuum pan by opening the valve $b'$ while the corresponding valves of the other vats remain closed. The exhaust mechanism withdraws the vapor through the pipe D and thereby causes the liquor from the vat to be drawn into the vacuum pan. The liquor passes through the vertical tubes $C^2$ and is heated to the desired degree by the steam surrounding such tubes. The evaporation continues until the desired concentration has been accomplished. When the concentrated liquor is to have the consistency of condensed milk, six pounds of the sour liquor from the vat are reduced to one pound of about 18 to 24% acidity and having a specific gravity of 1.116 or 15 degrees Baumé at a temperature of 60 degrees F. The exact consistency of the liquor within the vacuum pan may be readily ascertained by opening the valves $g'$ and $g^2$ to permit the liquor to flow into the gage G and then closing such valves and opening the valve $g$.

The consistency of liquor is indicated by its appearance within the gage as it is a clear green at first and subsequently becomes so sticky as to adhere to the interior of the glass gage. When the desired consistency has been attained the condensed liquor is permitted to flow through the conduit E from the vacuum pan in the receptacle F.

In order that the concentrated liquor may possess the desired bacterial action, from one to five gallons of the unconcentrated natural sour liquor are added and thoroughly mixed with fifty gallons of the concentrated liquor after the same has cooled. The bacterial action required in the various steps of tanning the skins or hides may be readily attained in this manner inasmuch as the unconcentrated liquor contains the full strength of bacterial action undiminished by high temperature. The concentrated liquor, however, has not been subjected to such heat as to destroy its bacterial action inasmuch as the temperature in the vacuum pan does not exceed 165 degrees F. The proportion of unconcentrated liquor may be varied and in some instances the concentrated liquor may be used without having mixed therewith unconcentrated liquor.

From the foregoing description it will be observed that I have invented a bacterial substance, and a process for making the same from milk, of high natural organic acidity containing no foreign substances whatever, and readily miscible in even cold water, thereby rendering it possible to make the substance of any desired liquid form and strength. While my improved substance contains about 18 to 24% free organic acidity, and about 14 to 16% anhydrous organic acidity, such as citric acid, lactic acid, sugar of milk and some albumenoids, it contains no mineral or other acid, or other ingredient which would in any way injure the texture of the skins or hides or attack the gelatin therein.

My improved bacterial substance may be utilized in various ways in tanning leather and may be readily adapted to different processes of treating hides and skins in the manufacture of all kinds of leather, and I therefore do not wish to limit myself to any particular proportions of the substance to be used in the various steps of tanning processes. I have, however, found in practice that in bating or unliming one pound concentrated, or six pounds of raw liquor is sufficient for 100 pounds of raw hides or skins. Even larger quantities will, however, have no injurious effect and smaller quantities will accomplish the desired result. In the step of pickling or preserving approximately one-half pound of concentrated or three pounds of the raw fermented liquor may be used for 100 pounds of raw hides or skins in connection with the required amount of salt. For plumping or swelling 100 pounds of hides or skins three pounds of the concentrated added to 800 gallons of water or 18 pounds of the unconcentrated liquor without any water, may be successfully used and even a bath of the concentrated liquor alone will not injure hides, but will accomplish the plumping rapidly. In the tanning or filling step an addition of three pounds of concentrated or 18 pounds of unconcentrated liquor to the tannic liquor is sufficient for the required fermentation, but a greater or less quantity may be used with excellent results.

When it is desired to plump skins or hides they are treated in cold water to which has been added my improved substance and the treatment is continued for a considerable period in order to enable the bacteria to develop and act upon the organic matters of the hides or skins. After the plumping process has been completed the hides or skins are found to be heavier and at the same time of finer texture than before treatment. In making the lighter classes of leather the only step of the process in which it is desirable to use my improved fermented substance is that of bating. The treatment for this purpose is accomplished at a temperature of 80 to 90 degrees F., but it is continued for only a short time so that the bacteria are not given an opportunity to develop; the hides or skins are therefore depleted, that is, rendered thin and flexible to such an extent that the pressure of the fingers upon the hides or skins leaves substantially transparent marks.

Having now fully described my invention, what I claim as new and desire to secure by Letters Patent is:

1. The process of making a substance for the purpose described which consists in removing the curd from milk and in permitting the sour liquor remaining after the removal of the curd to ferment for a period of at least seven days.

2. The process of making a substance for the purpose described which consists in heating milk to promote the precipitation of the curd, in removing the precipitated curd, and in permitting the sour liquor remaining after the removal of the curd to ferment for a period of at least seven days.

3. The process of making a substance for the purpose described, which consists in heating milk to promote the precipitation of the curd, further promoting the precipitation by adding sour liquor previously obtained from milk, removing the precipitated curd, and permitting the sour liquor remaining after the removal of the curd to ferment for a sufficient period to convert at least 1% thereof into acid.

4. The process of making a substance for the purpose described which consists in removing the curd from milk, and in permitting the sour liquor remaining after the removal of the curd to ferment for a sufficient period to convert at least 1% thereof into acid calculated as lactic acid.

5. The process of making a substance for the purpose described, which consists in promoting the precipitation of the curd in milk by adding thereto sour liquor previously obtained from milk, in removing the precipitated curd, and in permitting the sour liquor remaining after the removal of the curd to ferment for a sufficient period to develop at least 1% acidity calculated as lactic acid.

6. The process of making a substance for the purpose described, which consists in removing the curd from milk, in developing bacteria in the sour liquor remaining after the removal of the curd by permitting fermentation thereof for a sufficient period to convert at least 1% thereof into acid calculated as lactic acid, and in concentrating the fermented sour liquor to a degree insufficient to destroy the developed bacteria.

7. The process of making a substance for the purpose described, which consists in removing the curd from milk, in permitting the sour liquor remaining after removing the curd to ferment for a sufficient period to convert at least 1% thereof into acid calculated as lactic acid, in concentrating the fermented sour liquor, and in adding a predetermined quantity of unconcentrated fermented sour liquor obtained from milk.

8. The process of making a substance for the purpose described, which consists in removing the curd from milk, permitting the sour liquor after the removal of the curd to ferment for a sufficient period to convert at least 1% thereof into acid calculated as lactic acid, promoting fermentation by adding sour rye flour dough, and concentrating the fermented sour liquor.

9. A bacterial substance for the purpose described, produced from whey and composed of fermented sour liquor having at least 1% acidity calculated as lactic acid.

10. A bacterial substance for the purpose described, produced from whey and composed of concentrated fermented sour liquor having at least 1% acidity calculated as lactic acid before concentration.

11. A bacterial substance for the purpose described, produced from whey and composed of concentrated fermented sour liquor having at least 1% acidity calculated as lactic acid, and unconcentrated fermented sour liquor having at least 1% acidity calculated as lactic acid.

In testimony whereof, I sign this specification in the presence of two witnesses.

OTTOKAR HENRY NOWAK.

Witnesses:
 GEO. L. WILKINSON,
 C. A. MULLEN.